United States Patent
Weiss et al.

(10) Patent No.: US 9,426,947 B2
(45) Date of Patent: Aug. 30, 2016

(54) IRRADIATION DEVICE FOR IRRADIATING PLANTS

(71) Applicant: Heraeus Noblelight GmbH, Hanau (DE)

(72) Inventors: Oliver Weiss, Heusenstamm (DE); Sven Linow, Darmstadt (DE)

(73) Assignee: Heraeus Noblelight GmbH, Hanau (DE)

( * ) Notice: Subject to any disclaimer, the term of this patent is extended or adjusted under 35 U.S.C. 154(b) by 0 days.

(21) Appl. No.: 14/649,931

(22) PCT Filed: Dec. 6, 2013

(86) PCT No.: PCT/EP2013/075754
§ 371 (c)(1),
(2) Date: Jun. 5, 2015

(87) PCT Pub. No.: WO2014/090693
PCT Pub. Date: Jun. 19, 2014

(65) Prior Publication Data
US 2015/0313090 A1 Nov. 5, 2015

(30) Foreign Application Priority Data
Dec. 12, 2012 (DE) .................. 10 2012 112 192

(51) Int. Cl.
*G21K 5/04* (2006.01)
*A01G 7/04* (2006.01)

(52) U.S. Cl.
CPC .................................. *A01G 7/045* (2013.01)

(58) Field of Classification Search
USPC ............... 250/453.11, 454.11, 455.11, 493.1, 250/494.1, 504 R
See application file for complete search history.

(56) References Cited

U.S. PATENT DOCUMENTS

| 2008/0148630 | A1* | 6/2008 | Ryan et al. | ................. 47/17 |
| 2009/0251057 | A1 | 10/2009 | Son et al. | |
| 2010/0076620 | A1* | 3/2010 | Loebl et al. | ................. 700/306 |
| 2011/0252705 | A1 | 10/2011 | Van Gemert et al. | |
| 2014/0313716 | A1* | 10/2014 | Lang | ................. 362/235 |

FOREIGN PATENT DOCUMENTS

| DE | 202004009545 U1 | 10/2004 |
| GB | 1271006 A | 4/1972 |
| WO | 2010044662 A1 | 4/2010 |

OTHER PUBLICATIONS

International Search Report (with translation) and Written Opinion issued Feb. 19, 2014 in International Application No. PCT/EP2013/075754.

* cited by examiner

*Primary Examiner* — Nicole Ippolito
(74) *Attorney, Agent, or Firm* — Panitch Schwarze Belisario & Nadel LLP (57) ABSTRACT

A device is provided which ensures uniform irradiation of plants with infrared radiation along with ultraviolet and/or visible radiation and requires a small number of infrared emitters relative to the cultivation area. The infrared emitters are designed for temperatures of 800° C. to 1800° C. Each has a cylindrical emitter tube having a length of 50 mm to 500 mm. The emitter tubes extend parallel to one another in an emitter zone located above the culture plane. The infrared emitter occupation density relative to the area of the culture plane is between 0.2 $m^{-2}$ and 1.0 $m^{-2}$. Irradiation regions of adjacent infrared emitters on the culture plane overlap such that average irradiance on the culture plane is between 10 watt/$m^2$ and 100 watt/$m^2$ with a variation range of a maximum of 50%. A reflector facing a structural space is assigned to a top side of the emitter tube.

22 Claims, 4 Drawing Sheets

IRRADIATION DEVICE FOR IRRADIATING PLANTS

CROSS-REFERENCE TO RELATED APPLICATIONS

This application is a Section 371 of International Application No. PCT/EP2013/075754, filed Dec. 6, 2013, which was published in the German language on Jun. 19, 2014, under International Publication No. WO 2014/090693 A1 and the disclosure of which is incorporated herein by reference.

BACKGROUND OF THE INVENTION

The present invention relates to an irradiation device for irradiating plants, comprising a carrier element defining a culture plane E for cultivating the plants, multiple irradiation sources for irradiating the plants with visible and/or ultraviolet radiation, and multiple infrared emitters for irradiating the plants with infrared radiation.

The present invention further relates to an emitter module for irradiating plants with infrared radiation for use in an irradiation device.

For the breeding and cultivation of plants, for example in greenhouses and in tiered crop growing, artificial light sources are used. The emission spectrum of these light sources is usually adapted to the absorption spectrum of the green leaf pigment of chlorophyll and carotenes Several natural pigments that are essential to the photosynthesis process are combined under the terms chlorophyll and carotene. The absorption spectra of these pigments dissolved in solvents have two pronounced absorption maximums, namely one absorption maximum in the violet and blue spectral range between 400 nm and 500 nm, and another absorption maximum in the red spectral range of visible light between 600 nm and 700 nm.

To ensure efficient irradiation of plants, the emission spectrum of artificial light sources for irradiating plants has large radiation components in both wavelength ranges specified above.

As light sources, for example, gas discharge lamps or light emitting diodes (LEDs) are used. Gas discharge lamps consist of a discharge chamber filled with a filling gas and in which two electrodes are arranged. A gas discharge associated with the emission of visible radiation takes place in the discharge chamber as a function of a voltage applied to the electrodes. The wavelength of the emitted radiation can be influenced by a selection of the filling gas and adapted to the absorption spectrum of the chlorophyll, for example by an appropriate doping of the filling gas. In contrast, LEDs emit light only in a limited spectral range, so that, for generating an emission spectrum adapted to the absorption spectrum of the chlorophyll, multiple LEDs of different wavelengths must be combined with each other. For example, from U.S. patent application publication 2009/0251057 A1, an artificial light source is known having multiple LEDs in which, for generating artificial sunlight, light emitting diodes having different emission spectra are combined.

However, efficient cultivation of plants depends not only on the excitation of photosynthesis, but also on the transport of water and nutrients in the plant and on the carbon dioxide assimilation. Both the water and nutrient transport in the plant and also the carbon dioxide assimilation are influenced by the stomatal apparatus of the plant. By the stomata of the plant, the plant regulates the gas exchange with the ambient air, in particular the absorption of carbon dioxide from the air and the emission of oxygen to the air. The water balance of the plant is also influenced by the opening width of the stomata. Thus, opened stomata lead to increased water evaporation that generates transpiration suction, so that, overall, the transport of water and nutrients (sap flow) from the roots to the leaves is increased.

The opening width of the stomata can be regulated by several factors that include, for example, the temperature, the availability of water, the carbon dioxide concentration in the leaf interior, and the absorption of light. By a targeted irradiation with infrared radiation, the stomata width and thus the effectiveness of photosynthesis can be regulated.

In International patent application publication WO 2010/044662 A1, an irradiation device for plants is proposed having a chamber in which, in addition to the radiation sources for irradiating the plants with visible or ultraviolet radiation, multiple infrared emitters arranged on a side wall of the chamber are provided for irradiating the plants with infrared radiation. By the infrared emitters, the leaves of the plants are heated such that the stomata open, so that a stimulation of the exchange processes of the plants with their surroundings is achieved.

Due to the lateral arrangement of the infrared emitters, the individual plants are irradiated as a function of the their planted position on the culture plane each at a different spacing to the infrared emitters and are therefore irradiated to different degrees. It has been shown that, in particular, compared with the inner areas of the culture area, the outer areas of the culture area are exposed to higher irradiation intensities. To ensure efficient cultivation of the plants, however, in principle uniform growth of the plants and thus homogeneous irradiation of all plants is desirable.

With a lateral arrangement of the infrared emitters in relation to the cultivation surface, a large number of emitters is required, which must have a low power output in order not to damage the plants in the outer area of the culture area due to excessive heating. Infrared emitters, however, typically have a high power output; emitters of low power output are complicated to make and have only a limited service life.

In addition, the lateral arrangement of the infrared emitters also contributes to irradiation and heating of the other components provided in the irradiation device, for example the electrical cables and mounting elements for the radiation sources, and also the radiation sources provided in the irradiation device, whereby the service lives of these components are shortened due to the irradiation. A lateral arrangement of the infrared emitters is therefore associated with high operating costs.

BRIEF SUMMARY OF THE INVENTION

The invention is therefore based on the object of providing an irradiation device for irradiating plants, which has a long service life and ensures, in addition to irradiating plants with ultraviolet and/or visible radiation, a uniform irradiation of the plants with infrared radiation, without unnecessarily negatively affecting the irradiation with ultraviolet and/or visible radiation and, in addition, requires a small number of infrared emitters in relation to the culture area.

The invention is further based on the object of providing an emitter module for irradiating plants with infrared radiation, which is designed for optimal use in an irradiation device for irradiating plants.

Finally, the invention is also based on the object of minimizing losses in the conversion of electrical energy into infrared radiation, losses in the steering of the infrared radiation to the plants to be irradiated, mutual shading of light sources, and other energy losses.

With respect to the irradiation device, according to the invention this object is solved, starting from a device of the generic type described at the outset, in that the infrared emitters are designed for a temperature from 800° C. to 1800° C. and each has a cylindrical emitter tube having an emitter tube length in a range from 50 mm to 500 mm, and that the emitter tubes extend parallel to each other in an emitter zone Z placed above the culture plane E, wherein the infrared emitter population density in relation to the surface area of the culture plane E is in a range between $0.2\ m^{-2}$ and $1.0\ m^{-2}$, and irradiation areas of adjacent infrared emitters overlap on the culture plane E, in that the average irradiation intensity on the culture plane E is between $10\ W/m^2$ and $100\ W/m^2$ with a maximum fluctuation range of 50%, and that a reflector directed toward an installation space B is allocated to a top side of the emitter tube.

Sunlight, which plants need under natural conditions for their growth, has radiation components of ultraviolet, visible, and infrared radiation. For simulating natural growth conditions, the artificial irradiation device therefore also has infrared emitters, in addition to emitters for generating ultraviolet and/or visible radiation (hereinafter also called UV and VIS emitters, for short). By the use of these emitter types, the plants are provided, under artificial cultivation conditions, on one hand with the radiation required for photosynthesis and, on the other hand, the opening width of the leaf stomata can be regulated by the infrared radiation, so that an optimum transport of water and nutrients is set within the plant. By these measures, quick plant growth and high productivity are ensured.

To ensure the most uniform possible plant growth, however, it is necessary to irradiate the plants as uniformly as possible, that is, with a nearly constant irradiation intensity. This applies, in particular, also for the irradiation of plants with infrared radiation. A local infrared irradiation intensity that is too high leads to damage of the affected plants. In contrast, too low an irradiation intensity reduces the effect of the infrared radiation on the opening width of the stomata; it leads to too little plant growth.

In the irradiation device according to the invention, the infrared emitters are arranged in an emitter zone Z placed above the culture plane E. Here, it is important that the infrared emitters generate an overall uniform irradiation area on the culture plane E. Infrared emitters arranged exclusively laterally of the irradiation surface can thus be eliminated.

To achieve an overall uniform irradiation area on the culture plane E, the infrared emitters are arranged in the emitter zone Z and distributed uniformly relative to each other, such that their emitter tube longitudinal axes run parallel to each other. The parallel arrangement of the emitter tubes ensures a two-dimensional emission of the infrared radiation, which is especially suitable for uniform irradiation of a plane, for example, a plane of the plants defined by the plant growth or the culture plane.

With the uniform distribution of the infrared emitters in the emitter zone Z, it does not have to be taken into account that the UV and VIS emitters experience shading on the culture plane. The goal is thus not only a uniform infrared irradiation, but also a minimization of the shading of the UV and VIS radiation on the culture plane E.

Above the emitter tube, the irradiation device according to the invention has an installation space B. In this installation space, a plurality of components are arranged that are needed for the operation of the irradiation device, for example electrical cables or mounting elements for the infrared emitters or other radiation sources. Therefore, in principle it is desirable to prevent excessive heating of the components of the installation space by infrared/thermal radiation.

An excessive heating of the installation space and the components located therein is reduced according to the invention in that the emitter tube has, on its top side, a reflector that reduces the spreading of the emitted infrared radiation in the direction of the installation space. Because such a reflector, however, could simultaneously negatively affect the radiation spreading of the UV/VIS radiation emitted by the UV and VIS emitters arranged, for example, in the emitter zone, a largest possible radiation spreading of the UV and VIS emitter is ensured in that, in relation to the culture plane E, the lowest possible number of infrared emitters is used, and the reflector is shaped so that shading of the UV/VIS radiation is reduced.

In addition to minimal shielding of the UV/VIS radiation, the emission characteristics of the infrared emitter plays an important role. It should ensure that the infrared radiation is not just simply reflected downward, but instead is distributed over a wide irradiation range.

A uniform irradiation of the culture plane E with simultaneously smallest possible number of infrared emitters is achieved according to the invention, in that the reflector is shaped above the emitter tube so that the infrared radiation emitted from the area above the horizontal through the center of the heating coil is deflected into areas farther away from the radiation module.

Conventional reflectors, for example parabolic or hyperbolic reflectors, do not fulfill this function, because they reflect the radiation, in particular, into areas directly below the emitter tube.

A low emitter number goes along with a low number of reflectors. These can have larger dimensions with less radiation shielding at the same time, so that they can better contribute to uniform irradiation in the culture plane E. An optimal range for the number of infrared emitters in relation to the culture area is between $0.2\ m^{-2}$ and $1.0\ m^{-2}$. For a number of less than 0.2 infrared emitters per square meter, a uniform radiation distribution can be achieved only with difficulty, for example with large reflectors that then obstruct the radiation of the UV and VIS emitters also located in the emitter zone Z. A number greater than 1.0 infrared emitters per square meter results in reduced efficiency of the IR irradiation, because very small infrared emitters have a significantly lower conversion efficiency of electrical energy into infrared radiation. In addition, the mounting and maintenance expense increases with the number of units.

A low emitter number in relation to the culture plane also enables the use of smaller, but more powerful infrared emitters that have, in comparison with larger and less powerful infrared emitters, a higher conversion efficiency, so that they have lower heat losses and also longer service lives. For this reason, the length of the cylindrical emitter tubes is in a range from 50 mm to 500 mm.

The longer service life of such emitters is achieved in that the individual emitters are operated at the highest possible voltages approximately in a range of 24 V up to grid network. In this way, for example, only a small number of transformers is needed, so that heat losses caused by transformers are kept low. In this voltage range, larger, but less powerful emitters can be operated, however only at low current intensities, which makes the use of straight filaments having very small wire diameters (less than 0.4 mm) necessary. These filaments typically have low mechanical stability, inhomogeneous temperature distribution, and short service life.

To achieve uniform irradiation of the culture plane, with the use of fewer emitters, an overlapping of the irradiation areas of adjacent emitters is required, so that the average irradiation intensity has a maximum fluctuation range of 50%. The fluctuation range is understood to be the maximum deviation of the actual irradiation intensity at one point of the culture plane E from the average irradiation intensity. According to the invention, the actual irradiation intensity deviates at most by ±50% from the average irradiation intensity on the culture plane E. The deviation from the average irradiation intensity on the culture plane preferably equals 20%, especially preferred 10%. For optimum growth of the plants, the emission spectrum of the infrared emitters is also significant. The absorption spectrum of plants is marked by high absorption in the wavelength range below 700 nm and also above 2.5 μm. In a range between 0.7 μm and 2.5 μm, a basic absorption of approximately 5% and a nearly undirected scattering is observed. Radiation having wavelengths in this range is suitable for penetrating the top-most leaf layers of a plant; it is basically also available for irradiation of the lower leaf layers, but is absorbed only at lower percentages. It has been shown that an optimum plant growth is achieved if the heating filament is designed for a temperature from 800° C. to 1800° C., preferably for a temperature in a range from 850° C. to 1500° C.

Emitters that have a filament temperature in a range named above at a nominal voltage emit radiation having an intensity maximum at wavelengths in a range between 0.7 μm and 3.5 μm.

Here, a difference must be distinguished between applications that target an optimum irradiation only of the upper leaf layers and those in which the lower leaf layers are also to be irradiated. The use of medium-wavelength thermal infrared emitters is advantageous, if nearly the entire radiation is to be absorbed or reflected on the top-most leaf layer. Such emitters have, at a nominal voltage, a filament temperature in a range between 800° C. and 1000° C. Short-wave thermal infrared emitters having a filament temperature at a nominal voltage in a range between 1400° C. and 2200° C., preferably between 1400 and 1800° C., are especially suitable for penetrating the upper leaf layers.

Radiation generated at filament temperatures in the transition range between 1000° C. and 1400° C. is produced by a mixture of the two mechanisms.

In a first advantageous embodiment of the device according to the invention, it is provided that the average irradiation intensity on the culture plane is 10 W/m² to 50 W/m².

The required average irradiation intensity on the culture plane depends on the type of plant to be cultivated and other environmental conditions. It has been shown that for many plant types, an irradiation intensity in a range of 10 W/m² to 50 W/m² leads to accelerated growth and thus to shorter average durations of stay of the plant in the cultivation chamber.

In another similarly preferred embodiment of the irradiation device according to the invention, it is provided that multiple infrared emitters are arranged one behind the other in the direction of their longitudinal axes, and that adjacent infrared emitters have, in the direction of their longitudinal axis, a spacing from each other between 0.9 m and 2.3 m, preferably between 1.1 m and 1.7 m.

To ensure uniform irradiation of the culture plane both with ultraviolet/visible radiation and also with infrared radiation in the most cost-efficient way possible, properties in conflict with each other or mutually affecting each other must be optimized, such as emitter power output, emitter size, and emitter population density. In principle, a low emitter density of the infrared emitters is desirable. A spacing between adjacent infrared emitters of less than 0.9 m, however, leads to a comparatively high emitter density, which is associated with low nominal output power per emitter and high installation and operating costs. If adjacent infrared emitters in the direction of their longitudinal axes have a spacing of more than 2.3 m, a uniform irradiation of the culture plane with infrared radiation is to be achieved only with difficulty.

Preferably, the infrared emitters are arranged in parallel rows, wherein adjacent rows run such that the infrared emitters of adjacent rows are arranged one next to the other.

In other words, the infrared emitters of adjacent rows are not offset "staggered" relative to each other, but instead begin and end—with equal length—at the same longitudinal positions of the illumination field within the emitter plane Z. In connection with the shape of the reflectors, this results in lower mutual influence and optimum homogeneous irradiation density on the plant plane.

In this context, it has also proven effective if adjacent infrared emitters arranged parallel to each other have a spacing from each other between 1 m and 3 m, preferably between 1.3 m and 2.5 m, especially preferred between 1.5 m and 1.8 m.

It has proven advantageous if the infrared emitters have a spacing from the culture plane of 1.0 m±0.5 m. For larger spacings, all of the dimensional and power specifications must be scaled accordingly.

The spacing of the infrared emitters and the culture plane influences the irradiation intensity and its distribution on the culture plane E. Depending on the type of plant, a spacing of the infrared emitters from the culture plane from 0.5 m to 1.5 m has proven effective. At a spacing of less than 0.5 m, plants can be irradiated only up to a low growing height. A spacing of the infrared emitters greater than 1.5 m negatively affects a compact construction of the irradiation device.

In a preferred modification of the irradiation device according to the invention, the reflector—viewed in the direction of the longitudinal axis—has a length in a range between 70 mm and 650 mm, preferably between 250 mm and 450 mm and a width in a range between 50 mm and 160 mm, preferably in a range between 80 mm and 130 mm.

The length of the reflector is adapted to the length of the emitter tube. A reflector length of less than 70 mm is only conditionally suitable for reducing an emission of infrared radiation in the direction of the installation space for an emitter tube length of the infrared emitter of at least 50 mm. For such short emitter tubes, a high number of infrared emitters is also required, which increases the failure probability, the installation expense, and the operating costs. A reflector having a length greater than 650 mm for a maximum emitter tube length of 500 mm leads to increased shielding of ultraviolet and/or visible radiation. The use of larger reflectors is also disadvantageous, because larger, but less powerful emitters operated at low current intensities then also must be used, which, in turn, makes the use of straight filaments having very small wire diameters (less than 0.4 mm) necessary. These filaments typically have poor mechanical stability, inhomogeneous temperature distributions, and short service lives.

The reflector width between 50 mm and 160 mm represents, for the same reasons, a suitable compromise between the shielding of the infrared radiation at the top and obstruction of the irradiation of the culture plane with ultraviolet and/or visible radiation.

In a similarly preferred modification of the irradiation device according to the invention, the reflector has a diffusely reflective surface.

A diffuse reflection of light takes place, for example, when light is incident on a rough surface having multiple surface elements having different orientations. A light beam incident on a diffusely reflective surface is reflected by the surface structure in many different directions, so that scattering produces is produced. Scattered light is suitable especially for generating uniform irradiation intensities, because maxima in the irradiation intensity are weakened, and the difference between minimum and maximum irradiation intensity on the culture plane E is reduced.

Here, it has proven effective, if the surface has a mechanically embossed structuring, for example produced from hammered aluminum. Suitable materials here are, for example, the MIRO®-DESSIN materials of ALANOD Aluminium-Veredlung GmbH.

A surface made of hammered aluminum has a diffusely reflective effect, leads to low radiation losses due to its rough surface structure, and is also simple and economical to produce.

In another preferred embodiment of the irradiation device according to the invention, it is provided that a first reflector strip running in the direction of the longitudinal axis is applied on a lateral area of the cover surface of the emitter tube.

A reflector strip applied on the lateral surface of the emitter tube prevents emission of infrared radiation in this area of the lateral surface. In this way, not only the lateral emission in the direction of the UV/VIS radiation sources also located in the emitter zone Z is reduced, but also the emission in the direction of the installation space, that is, depending on the size of the coverage angle. The mounting of reflector strips directly on the emitter tube allows a reduction of the reflectors above the emitter tubes for the same effectiveness, which concerns the reduction of the spreading of infrared radiation in the direction of the installation space. Smaller reflectors above the emitter tubes also negatively affect the visible radiation emitted by UV/VIS emitters mounted in the emitter zone Z to a lesser degree, so that a more uniform irradiation with ultraviolet and/or visible radiation is made possible.

It has proven advantageous if the reflector strip is made of gold, opaque quartz glass (silicon dioxide), or ceramic (for example aluminum oxide).

Reflector strips made of these materials are distinguished by strong reflection in the IR range, good chemical resistance, and, in some sections, high temperature resistance. They can also be easily applied on the emitter tube.

It has proven favorable, if the emitter tube has a circular cross section, wherein the reflector strip covers a circular arc of the emitter tube, which encloses, with a horizontal running through the filament center, a coverage angle between −40° and +40°, preferably −30° and +30°.

A reflector strip having such a coverage angle covers the emitter tube in the lateral direction above and below the horizontal. The coverage angle can be different above and below the horizontal, wherein optionally the amount of the coverage angle below the horizontal is preferably less than that above the horizontal. Therefore, because the reflector strip is arranged in the coverage angle range above and below the horizontal, on one hand an emission of infrared radiation having a flat emission angle with respect to the horizontal in the direction of the installation space and the UV/VIS radiation sources in the emitter zone and, on the other hand, a side, downward directed emission of infrared radiation having a flat emission angle can be reduced.

In a preferred construction of the last described embodiment of the irradiation device according to the invention, another reflector strip is applied on the lateral surface that is arranged mirror-symmetric to a vertical running through a filament center in relation to the first reflector strip.

Another reflector strip applied mirror-symmetric to the first reflector strip contributes to a symmetric and uniform irradiation of the culture plane.

It has proven effective if the reflector strip has a diffusely reflective surface.

Such a reflector strip contributes to a homogeneous irradiation of the culture plane E.

In a preferred modification of the irradiation device according to the invention, it is provided that, additional reflectors are arranged in each reflector plane laterally of the emitter tube, wherein the reflector planes enclose with the horizontal an angle between 25° and 70°, and their dimensions and spacing from the emitter tube are adjusted, such that they prevent direct emission of infrared radiation emitted by the emitter tube into a spatial area which, starting from a filament center of the emitter tube, is described by two planes, which each enclose, with the horizontal, an angle between −40° and +40°, preferably between −30° and +30°.

The two additional reflectors arranged laterally of the emitter tube are straight or shaped as a conical section. The lateral reflectors reflect the radiation from the region of a circular arc of the emitter tube that encloses, with a horizontal running through the center of the filament, an angle between −40° and +40°, preferably −30° and +30°. The lateral reflectors stand at an angle between 25° and 70° relative to the horizontal.

The coverage angle can be different above and below the horizontal, wherein optionally the amount of the coverage angle below the horizontal is preferably less than that above the horizontal. Therefore, because the lateral reflectors cover the angle range above and below the horizontal, on the one hand, an emission of infrared radiation having a flat emission angle in relation to the horizontal in the direction of the installation space and the UV/VIS radiation sources in the emitter zone can be reduced and, on the other hand, lateral, downward directed emission of infrared radiation can be regulated by the setting of the reflector angle relative to the horizontal or by the type and shape of the conical section.

In a preferred construction of the last described embodiment of the irradiation device according to the invention, the lateral reflectors have a diffusely reflective surface.

In another preferred modification of the irradiation device according to the invention, it is provided that two side wings are connected to the reflector, wherein the side wings each enclose with the horizontal an angle in a range between 20° and 40°.

The side wings reduce, in particular, an emission of infrared radiation in the direction of the installation space. In addition, the side wings can also reduce a lateral emission of infrared radiation in the direction of the UV/VIS radiation sources in the emitter zone. Therefore, they contribute—as described above—to a high energy efficiency of the irradiation device.

It has proven effective if the reflector has mirror symmetry to a reflector mirror plane, wherein, in sectional representation perpendicular to the reflector mirror plane, the shape of a symmetrical half of the reflector is described by a conical section, wherein the reflector tapers to a point centrally in the direction toward the emitter tube.

A conical section is a section of the surface of a circular cone or double circular cone having a plane. Conical sections are, for example, ellipses, parabolas, or hyperbolas, and are defined by the equation $y^2=2Rx-(k+1)x^2$, where R is the curvature radius and k is the conical constant of the conical section. It has been shown that with such a reflector, in particular for an irradiation of a large irradiation area, a uniform irradiation distribution on the culture plane can be achieved.

It has proven favorable if at least one part of the surface of the emitter tube acts as a diffusor and diffusely scatters incident radiation.

A surface diffusely scattering incident radiation basically leads to a more uniform, non-directed radiation spreading. A diffusor therefore contributes to a uniform irradiation of the plants in the irradiation device. In a preferred embodiment, the entire surface of the emitter tube is constructed as a diffusor.

In this respect, the emitter tube preferably has a roughened surface acting as a diffusor having an average roughness Ra, wherein the average roughness Ra is in a range between 0.3 µm and 10 µm, preferably between 0.8 µm and 3 µm.

Roughened surfaces acts as diffusors, wherein their diffusor properties depend on the average roughness of the surface. The average roughness Ra is defined as the vertical measured value according to DIN EN ISO 4288:1988. Roughened surfaces having such a roughness exhibit nearly Lambertian scattering. The rate of backward scattering of the radiation incident on these surfaces is between 0% and 6%. A surface having an average roughness of less than 0.3 µm has a large component of backward scattered radiation.

It has proven favorable if the irradiation device comprises a housing having side walls, wherein a reflector foil, for example made of aluminum, is applied to at least one of the side walls.

A reflective inner lining by a reflector foil applied to the side walls of the irradiation device primarily reduces irradiation losses and can contribute to a uniform distribution of the irradiation intensity in relation to the culture plane. An especially symmetric, homogeneous radiation distribution is obtained if a reflector foil is applied to two opposing side walls or to all four side walls.

With the use of a reflective inner lining, infrared irradiation modules can be used in particular whose reflector is shaped such that a part of the radiation is emitted downwards in a flat angle relative to the horizontal into areas farther away from the irradiation module, which contributes to an overlapping of the irradiation areas, even with modules arranged in parallel and going beyond the closest neighbors, and a uniform distribution of the irradiation intensity in relation to the culture plane.

If no reflective inner lining is used, irradiation modules can be used in particular whose reflector is shaped such that the predominant part of the radiation is emitted into areas below the irradiation module, so that an overlapping of the irradiation areas is given mainly with the closest neighbor module arranged parallel thereto.

With respect to the emitter module, the object mentioned above is achieved according to the invention, starting from an emitter module of the generic type described at the outset, such that the infrared emitter has a cylindrical emitter tube having an emitter tube longitudinal axis, an emitter tube length of 50 mm to 500 mm, preferably 150 mm to 350 mm, and a heating filament arranged therein and designed for a temperature from 800° C. to 1800° C., wherein a reflector is allocated to one side of the emitter tube.

The emitter module is provided for use in an irradiation device according to the invention. With respect to this irradiation device, refer to the explanations above.

The emitter module is designed for the irradiation of plants. In particular, infrared emitters having a cylindrical emitter tube having an emitter tube length from 50 mm to 500 mm, preferably 150 mm to 350 mm, have a good size ratio, with which good results with respect to uniform irradiation intensity are achieved on the culture plane. They are suitable for achieving an average irradiation intensity on the culture plane from 10 W/m² to 100 W/m².

It has also been shown that an optimum plant growth is achieved if the heating filament is designed for a temperature from 800° C. to 1800° C. Emitters that have a filament temperature in the range stated above at the nominal voltage emit radiation having an intensity maximum at wavelengths in a range between 0.7 µm and 3.5 µm. The emitted radiation is therefore available for irradiating both the upper and also lower leaf layers.

Suitable modifications to the irradiation device according to the invention arise from the above explanations.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
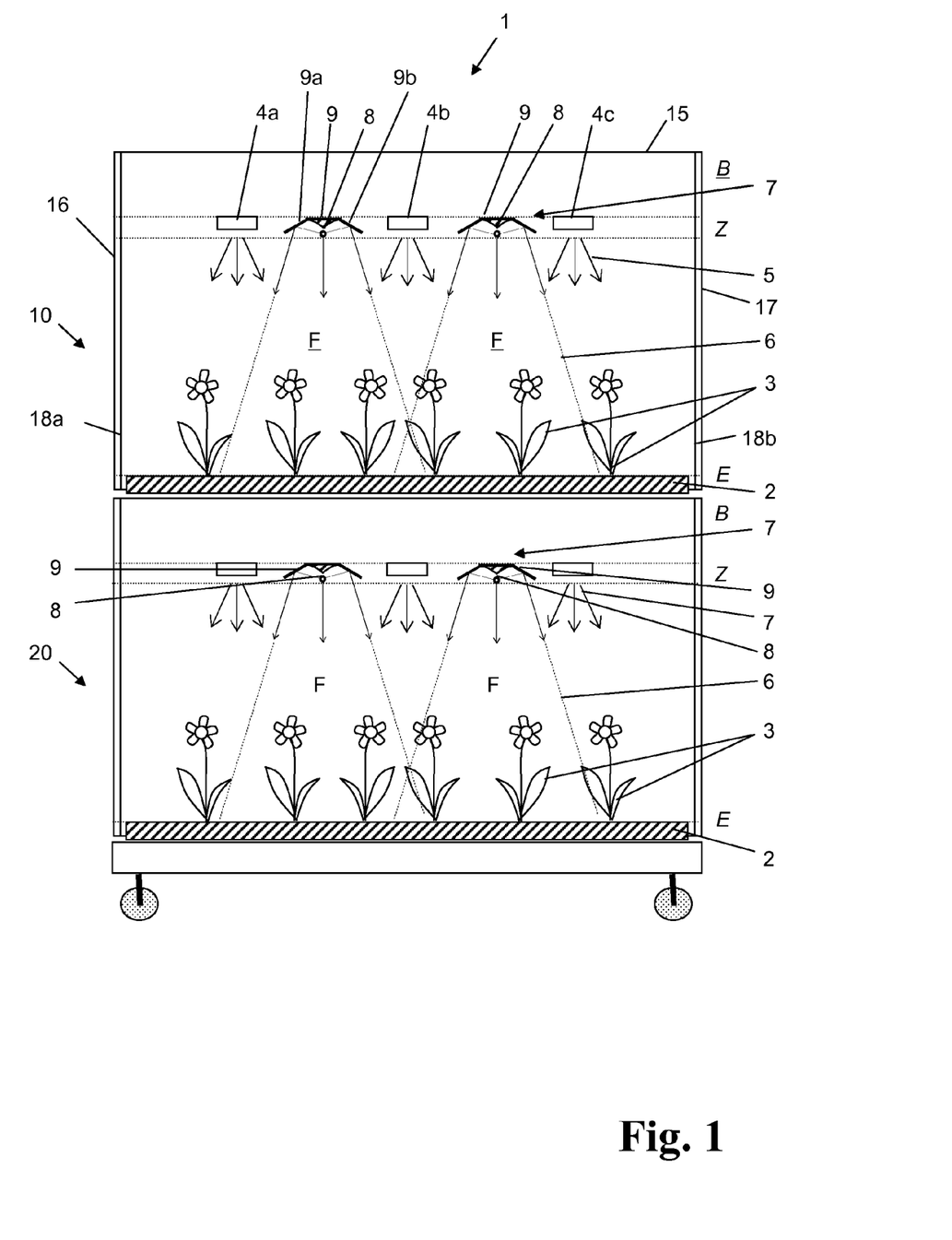
FIG. 1 is a first embodiment of the irradiation device having an emitter zone according to the invention for irradiating plants.

FIG. 1 shows an irradiation device for irradiating plants, which is designated overall with reference number 1. The irradiation device 1 is provided for tiered crop growing and comprises a housing 15 having five plant modules (tiers) arranged one above the other for the cultivation of plants, of which only two plant modules 10, 20 are shown in FIG. 1 for the purpose of simplification. The plant modules that are not shown have identical constructions to the plant modules 10, 20. A reflector film 18a, 18b is applied on both side walls 16, 17 of the housing.

The plant modules 10, 20 comprise a carrier element 2 and an installation space B arranged above the carrier element 2 and having electrical cables and mounting elements, as well as the emitter zone Z arranged under the installation space. The carrier element 2 is filled with dirt and planted with several plants 3. The surface of the planted carrier element defines a culture plane E. The emitter zone Z is located above the culture plane E. In the emitter zone Z there are LED strips 4a, 4b, 4c that emit essentially visual radiation 5 having wavelengths in the visible and ultraviolet range. In the emitter zone Z there are also several emitter modules 7 for irradiating the plants with infrared radiation 6.

The emitter modules 7 have an infrared emitter 8, wherein an irradiation area F on the culture plane is allocated to each infrared emitter 8, wherein this area is indicated by dotted lines 6 that symbolize the infrared irradiation.

The infrared emitters 8 are each designed for a nominal power of 100 W for a nominal voltage of 115 V. They have a cylindrical emitter tube made of quartz glass having an outer diameter of 13.7 mm and an emitter tube length of 240 mm.

The side of the emitter tube facing the culture plane E has an average roughness of 3.5 μm; it acts as a diffusor. Within the emitter tube there is a heating element that is operated at a temperature of 900° C. at nominal power output.

On the side of the infrared emitter 8 facing away from the culture plane E there is a reflector 9 that reduces the spreading of infrared radiation emitted by each infrared emitter 8 upward in the direction of the installation space B and laterally in the direction of the LED strips 4a, 4b, 4c.

The reflectors 9 each extend parallel to the infrared emitter 8 allocated to them and have a length of 390 mm and a width of 120 mm. The reflector 9 has a mirror-symmetric reflector base body, wherein the surface shape of one symmetry half is described in cross-sectional representation by a parabola. Two side wings 9a, 9b are connected to the reflector 9. Both side wings 9a, 9b enclose, with the horizontal, an angle of 30°. The surface of the side of the reflector 9 facing the infrared emitter 8 and the side wings 9a, 9b is produced from hammered aluminum; it has a diffusely reflective effect.

In an alternative embodiment it is provided that, on a side area of the lateral surface of the emitter tube, a reflector strip that runs in the direction of the longitudinal axis and is made of gold is mounted, as well as another reflector strip in a mirror-symmetric arrangement. These reflector strips reduce emission of infrared radiation 6 in the direction of the installation space and the other radiation sources in the emitter zone. Each reflector strip covers a circular arc of the emitter tube cross section that encloses, with a horizontal running through the filament center, a coverage angle between −2° and +25°, wherein the smaller angle magnitude is to be allocated to the area underneath the horizontal.

In the direction of the longitudinal axes of the infrared emitters 8 there are several structurally identical emitter modules 7 arranged one behind the other (not shown). Adjacent infrared emitters 8 have, in the direction of their longitudinal axis, a spacing of 1.54 m from each other. The spacing of adjacent infrared emitters arranged parallel to each other perpendicular to the direction of their longitudinal axes is 1.65 m. The infrared emitters have a spacing of 1.0 m from the culture plane E.

The infrared emitters 8 are arranged in the emitter zone Z relative to each other such that their emitter tube longitudinal axes run parallel to each other; they are arranged one next to the other in the sense that they begin and end at the same longitudinal position of the illumination field. The number of infrared emitters in relation to the area of the culture plane is 0.4 m$^{-2}$. In addition, the infrared emitters 8 are arranged in the emitter zone Z so that their irradiation areas F overlap laterally, such that the average irradiation intensity on the culture plane is 30 W/m$^2$.

Figure 2:
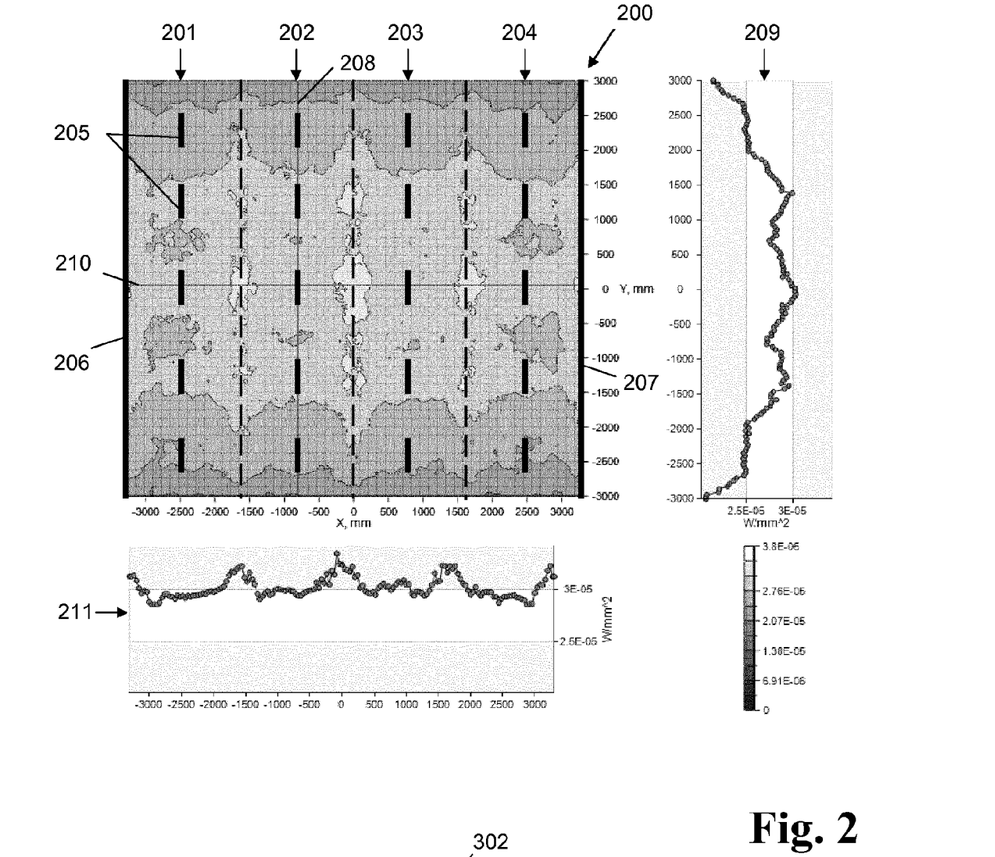
FIG. 2 is a ray-tracing simulation of the irradiation intensity for a second embodiment of the irradiation device according to the invention.

FIG. 2 shows a ray-tracing simulation of the irradiation intensity with infrared radiation of a second embodiment according to the invention of the irradiation device 200 for irradiating plants. In FIG. 2 the irradiation intensity on the plant plane at a spacing of 1 m from the infrared emitters is given in W/mm$^2$.

Figure 3:
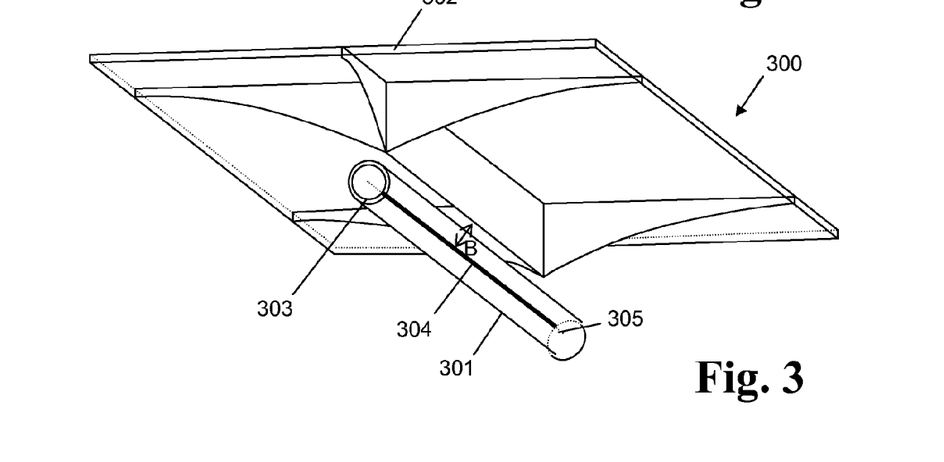
FIG. 3 is an embodiment of an emitter module according to the invention for use in an irradiation device according to the invention.

The irradiation device 200 used for the ray-tracing simulation has four plant tables 201, 202, 203, 204 arranged one next to the other, which together define the culture plane of the irradiation device. Each of the plant tables 201, 202, 203, 204 has a length of 6 m and a width of 1.65 m. Above each plant table 201, 202, 203, 204 there are five emitter modules 205 in an emitter zone Z each having an infrared emitter. In relation to the culture plane, the number of infrared emitters is approximately 0.5 m$^{-2}$. The nominal power output of the infrared emitter (for a nominal voltage of 115 V) is 96 W. The infrared emitter is distinguished by an emitter tube length of 260 mm, an emitter tube outer diameter of 10 mm, and by a heating filament arranged within the emitter tube. The spacing of the infrared emitter from the culture plane is 1.0 m. A reflector according to FIG. 3 is allocated to the side of the emitter tube facing away from the culture plane E. At the same height of the emitter zone Z there are multiple LED strips (not shown) for the emission of radiation in the ultraviolet and visible range. To ensure a homogeneous irradiation intensity, a reflective inner lining 206, 207 is provided on each of the two side walls of the irradiation device 200.

The diagram 209 also shows—viewed in the longitudinal direction of the plant table 202—the profile of the irradiation intensity in W/mm$^2$ along a center axis 208 of the plant table 202. The diagram 211 shows the profile of the irradiation intensity along a center axis 210 of the irradiation device 202. The average irradiation intensity on the entire culture plane E is 27 W/m$^2$ with a minimum irradiation intensity of 20 W/m$^2$ and a maximum irradiation intensity of 32 W/m$^2$.

In FIG. 3 an embodiment of an emitter module 300 for irradiating plants with infrared radiation is shown for use in an irradiation device according to the invention. The emitter module 300 comprises an infrared emitter 301 having an emitter longitudinal axis 305 and a reflector 302.

The infrared emitter 301 has a cylindrical emitter tube 303 made of quartz glass and a heating filament 304 arranged within the emitter tube 303. The infrared emitter is distinguished by an emitter tube length of 270 mm and by an outer diameter of 10 mm. The heating filament 304 is made of tungsten wire. The length of the heating filament 304 is 240 mm. The nominal power output of the emitter is 96 W at a nominal voltage of 115 V.

The reflector 302 has a length of 350 mm in the direction of the emitter longitudinal axis 305, and perpendicular thereto a width of 94 mm. The reflector 302 has a mirror-symmetric construction. The reflector surface of one mirror half has a curvature whose profile can be described by a conical section having the equation $y^2=2Rx-(k+1)x^2$. (The conical section constant k equals −1; the radius of curvature R equals 132 mm. The spacing B of the reflector to the center axis of the emitter tube 303 equals 7.5 mm.)

Figure 4:
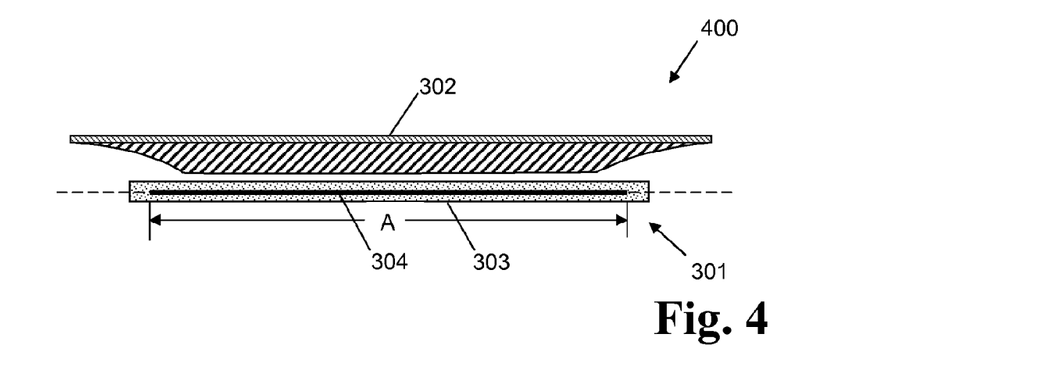
FIG. 4 is a side view of another emitter module according to the invention for use in an irradiation device according to the invention.

FIG. 4 shows an embodiment of an emitter module 400 according to the invention in a side view. Insofar as the same reference symbols in FIGS. 4 to 6 are used as in FIG. 3, these designate structurally identical or equivalent components and parts, as explained in more detail above with reference to the description of the embodiment according to FIG. 3 of the lamp unit according to the invention.

The emitter module 400 comprises an infrared emitter 301 having an emitter tube 303 and a heating filament 304 arranged therein, as well as a reflector 302. The length A of the heating filament 304 is 240 mm. The emitter tube 303 has a roughened surface having an average roughness Ra of 3.5 μm.

Figure 5:
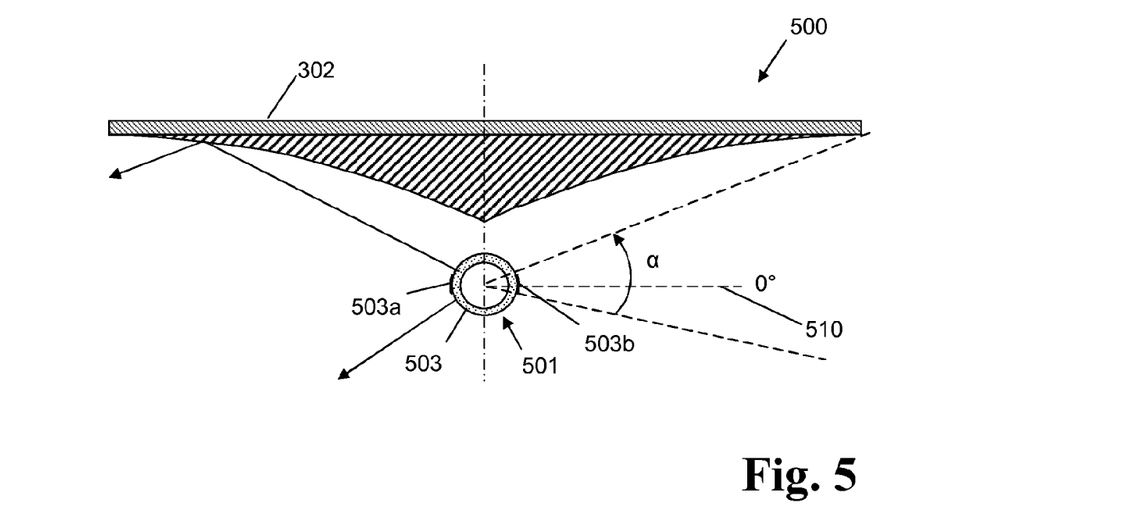
FIG. 5 is a cross section of another embodiment of the emitter module according to the invention having an infrared emitter, with two reflector strips being mounted on the emitter tube of this infrared emitter for reducing the irradiation emission in an angular range, and FIG. 6 in cross section, another embodiment of the emitter module according to the invention for use in an irradiation device according to the invention having two additional reflectors laterally of the emitter tube, and FIG. 7 in cross section, another embodiment of the emitter module according to the invention for use in an irradiation device according to the invention having a reflector in which two side wings are connected to the reflector.
Figure 6:
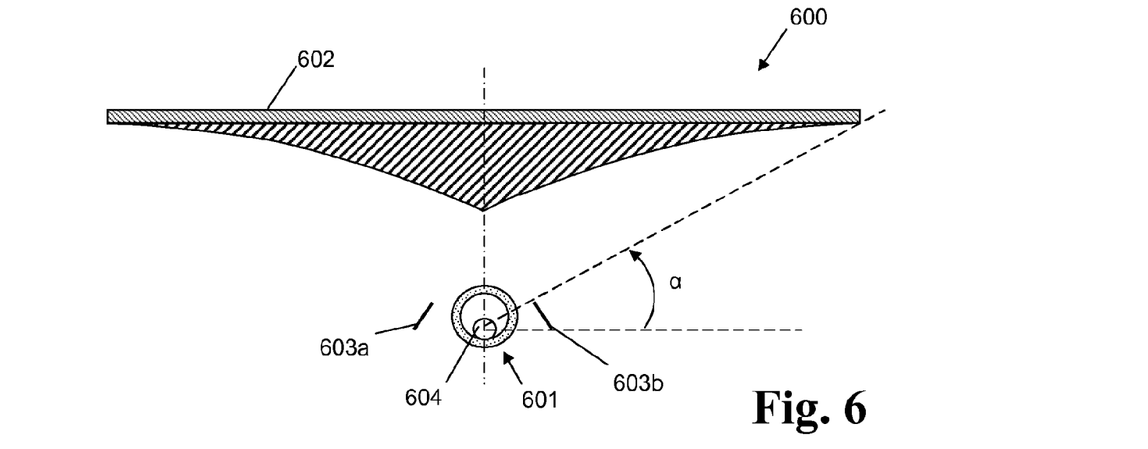

FIG. 5 shows a cross section of an emitter module 500 according to the invention having an infrared emitter 501, on whose emitter tube two reflector strips 503a, 503b are also mounted.

The infrared emitter 501 has a cylindrical emitter tube 503 made of quartz glass and a heating filament (not shown) arranged within the emitter tube 503. The nominal power output of the infrared emitter (for a nominal voltage of 115 V) is 96 W. It is distinguished by an emitter tube length of 260 mm and by an outer diameter of 10 mm. On the emitter tube 503 there are two reflector strips in the form of a gold coating that extends in the direction of the emitter tube longitudinal axis. The width of the reflector strip 503b is designed so that it covers a circular arc described by an angular area α between −5° and +22°, starting from a horizontal axis 510 to which the angle 0° is assigned. The reflector strip 503a is arranged mirror-symmetric to the reflector strip 503b; it covers a circular arc having an angular area α between 158° and 185°. The two reflector strips 503a, 503b reduce the emission of infrared radiation upward in the direction of the installation space and to the side in the direction of the UV/VIS radiation sources in the emitter zone, whereby this ensures, for example, a longer service life of the radiation sources arranged there.

FIG. 6 shows a cross section of an emitter module 600 according to the invention having an infrared emitter 601 having two additional reflectors 603a, 603b arranged laterally of the emitter tube.

The infrared emitter has a cylindrical emitter tube made of quartz glass and a heating filament 604 arranged on the bottom of the emitter tube. The nominal output power of the infrared emitter (for a nominal voltage of 115 V) is 96 W. It is distinguished by an emitter tube length of 260 mm and by an outer diameter of 10 mm. The two lateral reflectors 603a, 603b are arranged such that they cover, with a horizontal through the center of the filament, an angle α of 28° above the horizontal and thus minimize the emission upward into the angular area not covered by the upper reflector 602. The angle of the lateral reflectors 603a, 603b relative to the horizontal is 55°, the spacing of the lateral reflectors 603a, 603b from the emitter tube is, at the shortest point, 3 mm. The spacing from the center axis of the emitter tube to the upper reflector 602, whose outer dimensions are 120×390 mm², is 15 mm. The shape of the upper reflector is described by a parabolic conical section having a radius of curvature of 115 mm.

Figure 7:
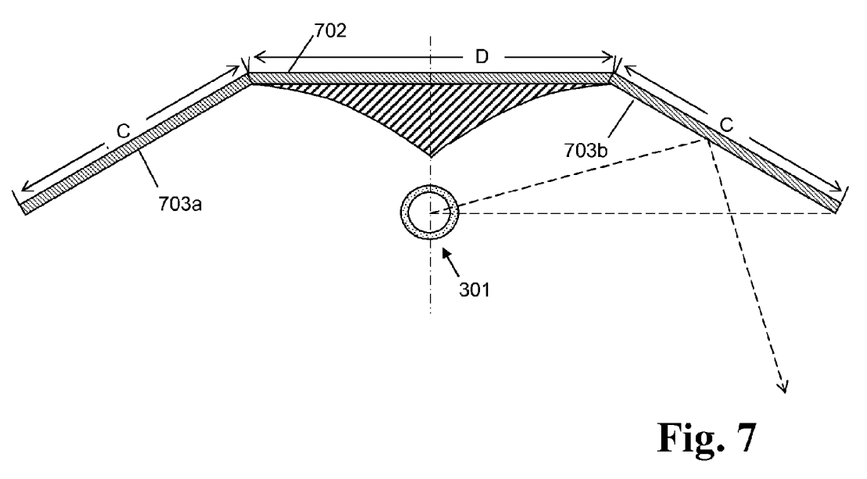

In FIG. 7 another embodiment of an emitter module 700 according to the invention is shown in cross section for use in an irradiation device according to the invention. The emitter module 700 comprises an infrared emitter 301 and a reflector 702, wherein two reflective side wings 703a, 703b are connected to the reflector 702. The two side wings 703a, 703b are arranged such that they enclose an angle of 30° with a horizontal. They have a width C of 84 mm. The width D of the reflector is 88 mm. Both the side wings 703a, 703b and also the reflector 702 have a length of 338 mm. The arrangement of the side wings 703a, 703b reduces the emission of infrared radiation upward in the direction of the installation space and laterally in the direction of the UV/VIS radiation sources in the emitter zone.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An irradiation device for irradiating plants, the device comprising a carrier element defining a culture plane for cultivating the plants, multiple radiation sources for irradiating the plants with at least one of visible and ultraviolet irradiation, and multiple infrared emitters for irradiating the plants with infrared radiation, the infrared emitters being designed for a temperature from 800° C. to 1800° C. and each of the infrared emitters having a cylindrical emitter tube having an emitter tube length in a range from 50 mm to 500 mm and a reflector facing an installation space B allocated to a top side of the emitter tube, wherein the emitter tubes extend parallel to each other in an emitter zone Z lying above the culture plane, wherein a population density of the infrared emitters in relation to a surface area of the culture plane is in a range between 0.2 m$^{-2}$ and 1.0 m$^{-2}$, and wherein irradiation areas of adjacent ones of the infrared emitters overlap on the culture plane, such that an average irradiation intensity on the culture plane is between 10 W/m² and 100 W/m² with a maximum fluctuation range of 50%.

2. The irradiation device according to claim 1, wherein the average irradiation intensity on the culture plane is 10 W/m² to 50 W/m².

3. The irradiation device according to claim 1, wherein heating filaments of the infrared emitters are designed for a temperature from 850° C. to 1500° C.

4. The irradiation device according to claim 1, wherein the multiple infrared emitters are arranged one behind another in a direction of their longitudinal axes, and wherein adjacent ones of the infrared emitters have, in the direction of their longitudinal axes, a spacing from each other between 0.9 m and 2.3 m.

5. The irradiation device according to claim 1, wherein adjacent ones of the infrared emitters arranged parallel to each other have a spacing from each other between 1 m and 3 m.

6. The irradiation device according to claim 1, wherein the infrared emitters have a spacing from the culture plane in a range of 1.0 m±0.5 m.

7. The irradiation device according to claim 1, wherein the reflector, viewed in a direction of its longitudinal axis, has a length in a range between 70 mm and 650 mm, and a width in a range between 50 mm and 160 mm.

8. The irradiation device according to claim 1, wherein the reflector has a diffusely reflective top surface.

9. The irradiation device according to claim 8, wherein the surface is made of hammered aluminum.

10. The irradiation device according to claim 1, further comprising a first reflector strip mounted on a lateral region of a cover surface of the emitter tube running in a direction of its longitudinal axis.

11. The irradiation device according to claim 10, wherein the first reflector strip is made of a material selected from gold, opaque quartz glass, and ceramic.

12. The irradiation device according to claim 10, wherein the emitter tube has a circular cross section, and wherein the first reflector strip covers a circular arc of the emitter tube, the circular arc enclosing a coverage angle between −40° and +40°, with a horizontal running through a filament center of the emitter tube.

13. The irradiation device according to claim 12, further comprising a second reflector strip mounted on the cover surface, wherein the second reflector strip is arranged mirror symmetric to the first reflector strip in relation to a vertical running through a filament center of the emitter tube.

14. The irradiation device according to claim 10, wherein the first reflector strip has a diffusely reflective top surface.

15. The irradiation device according to claim 1, further comprising additional reflectors each arranged in a reflector plane laterally of the emitter tube, wherein the reflector planes enclose an angle between 25° and 70° with a horizontal, and wherein dimensions and spacing of the reflector planes from the emitter tube are set such that they prevent direct irradiation emitted by the infrared emitter into a spatial area defined by two planes starting from a filament center of the emitter tube, and enclosing an angle between −40° and +40° with the horizontal.

16. The irradiation device according to claim 10, further comprising two side wings connected to the reflector, wherein the side wings each enclose an angle in a range between 20° to 40° with the horizontal.

17. The irradiation device according to claim 1, wherein the reflector has mirror symmetry to a reflector mirror plane, wherein, in sectional representation perpendicular to the reflector mirror plane, the shape of a symmetrical half of the reflector is defined by a conical section, and wherein the reflector tapers to a point at a center in a direction toward the emitter tube.

18. The irradiation device according to claim 17, wherein at least one part surface of the emitter tube acts as a diffuser and diffusely scatters incident radiation.

19. The irradiation device according to claim 17, wherein the emitter tube has a roughened surface acting as a diffuser having an average roughness Ra, and wherein the average roughness Ra is in a range between 0.3 μm and 10 μm.

20. The irradiation device according to claim 1, wherein the irradiation device comprises a housing having side walls, wherein a reflector film is applied on at least one of the side walls.

21. The irradiation device according to claim 1, wherein the maximum fluctuation range is 20% of the average irradiation intensity.

22. An emitter module for irradiating plants with infrared radiation using the irradiation device according to claim 1, the module comprising an infrared emitter having a cylindrical emitter tube having an emitter tube longitudinal axis, an emitter tube length of 50 mm to 500 mm along the longitudinal axis, and a heating filament arranged in the emitter tube and designed for a temperature from 800° C. to 1800° C., wherein one reflector is allocated to one side of the emitter tube.

* * * * *